United States Patent [19]

Midkiff

[11] Patent Number: 4,818,399

[45] Date of Patent: Apr. 4, 1989

[54] OIL SPILLAGE RECOVERY ARRANGEMENT

[76] Inventor: Harry E. Midkiff, R. 1, Owensville, Ind. 47565

[21] Appl. No.: 91,095

[22] Filed: Aug. 31, 1987

[51] Int. Cl.$^4$ .............................................. E02B 15/04
[52] U.S. Cl. ................... 210/242.3; 210/256; 210/257.1; 210/258; 210/923
[58] Field of Search ...................... 210/242.3, 923, 256, 210/257.1, 258, 259, 121

[56] References Cited

U.S. PATENT DOCUMENTS

| | | | |
|---|---|---|---|
| 3,852,193 | 12/1974 | Jakubek et al. | 210/923 |
| 3,862,040 | 1/1975 | Preus et al. | 210/923 |
| 3,957,646 | 5/1976 | Wickert | 210/242.3 |
| 4,203,842 | 5/1980 | DiPerna | 210/242.3 |
| 4,388,188 | 6/1983 | Morris | 210/923 |

*Primary Examiner*—Benoit Castel
*Assistant Examiner*—Richard D. Jordan
*Attorney, Agent, or Firm*—Warren D. Flackbert

[57] ABSTRACT

An oil spillage recovery arrangement characterized by a chamber or housing having a receptacle which receives a mixture of oil and water from a body of water, a siphoning conduit disposed within the receptacle for separating the oil from the water (where the latter passes outside of the receptacle and into the housing or chamber), and one or more other receptacles for receiving the recovered oil. Provision is made for the selective pumping of the accumulating water from the housing or chamber back into the body of water where the recovery arrangement is maintained, as, for example, a flowing stream. Provision is also made for directing the oil laden water into the recovery arrangement.

2 Claims, 1 Drawing Sheet

OIL SPILLAGE RECOVERY ARRANGEMENT

As is known, serious problems, including those classified as environmental, arise with the spillage of oil into a body of water or a stream, as, for example, one which passes through or is contiguous with an oil production area. At this time, and while various oil recovery approaches are available, such are mainly time consuming and costly in actual practice.

In contrast, the oil spillage recovery arrangement of the invention presents a floatable housing or chamber into which the unwanted oil laden water is introduced, where, thereafter, the oil is separated for desired subsequent use, and, ultimately and after proper filtering, the water is returned to the stream.

More specifically, the oil laden water is directed by floating booms to a gathering or inlet head, where the combined oil and water mixture then flows into a separating tank disposed within the floatable housing. The separating tank includes a siphoning tube extending to the outside thereof, permitting water passage into the housing, while the separated oil, which, due to specific gravity, flows upwardly, passes through a conduit to a removable receiving and/or storage bucket(s).

The separated water, due to the siphoning action, fills the bottom of the housing, where a floating electrical control selectively (to water level) oparates a pump for passing the water from the housing into the stream. A battery is provided for pump powering purposes and, additionally, provision is made for receiving ballast for the housing.

The arrangement presented herein is readily positionable in an oil contaminated stream, where the oil laden water is readily diverted to the housing for oil recovery/water separating action.

In any event, a better understanding of the present invention will become more apparent from the following description, taken in conjunction with the accompanying drawing, wherein

Figure 1:
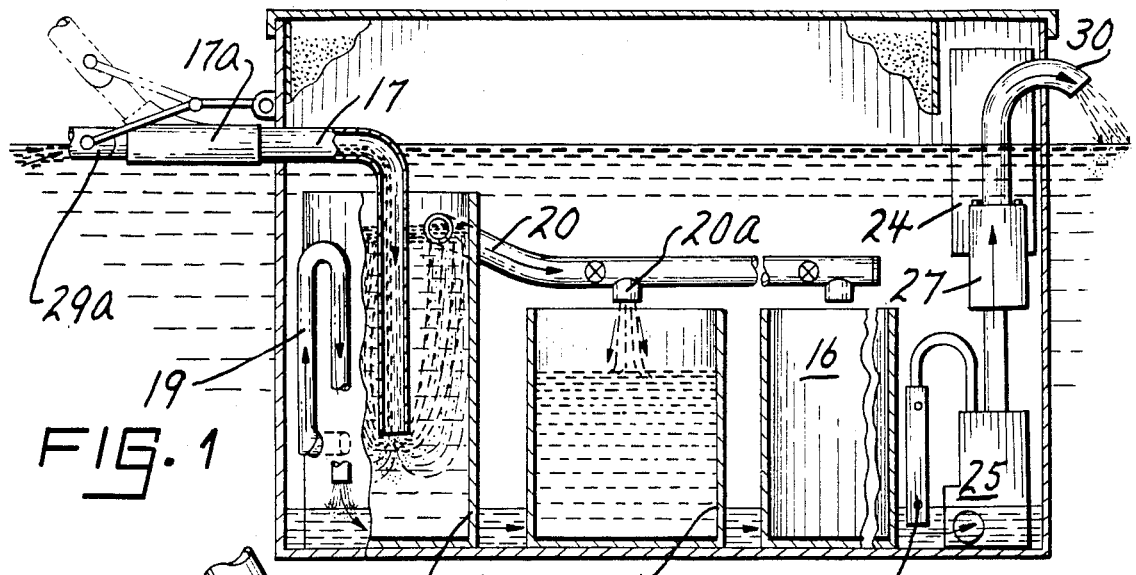
FIG. 1 is a view in vertical section showing an oil spillage recovery arrangement in accordance with the teachings of the present invention.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
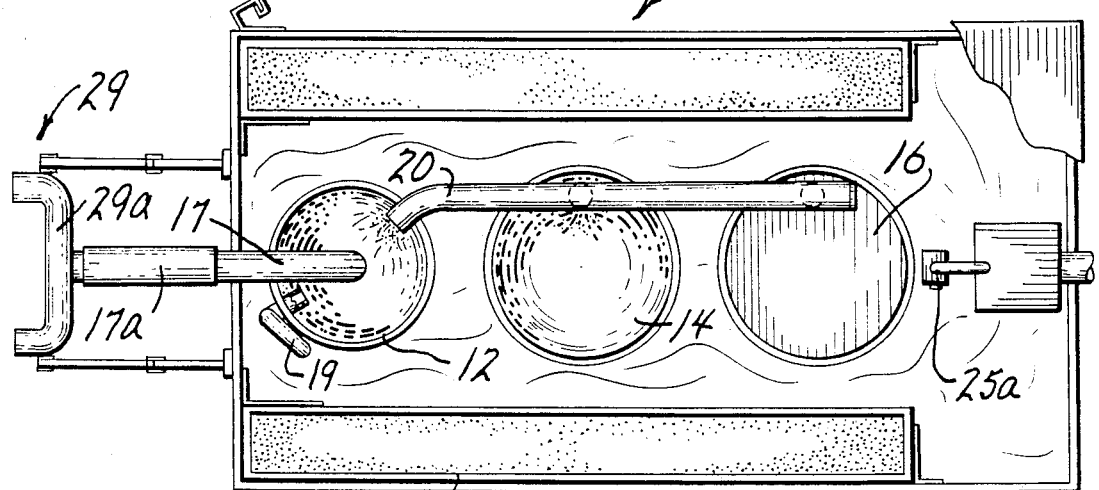
FIG. 2 is a top plan view of the invention, comparable to the showing of FIG. 1, and looking from top to the bottom thereof; and, FIG. 3 is a plan view of a typical installation employing the instant oil spillage recovery arrangement.

Referring now to FIGS. 1 and 2, the oil spillage recovery arrangement presented by the invention is characterized by a lidded floatable housing or chamber 10, where such includes compartments 10a for receiving ballast, such as sand or gravel, for steadying and/or submerging control purposes.

The housing or chamber 10 carries a tank or receptacle 12 which receives a mixture of incoming oil and water, and one or more other receptacles 14–16 which receive the separated oil, each of such being disposed on the bottom wall of the housing or chamber 10. The mixture of oil and water flows into the receptacle 12 through a conduit 17, where the receptacle 12 also mounts a separator or siphoning tube 19, the entrance to which is below the outlet of the conduit 17 and the outlet of which is outside of the receptacle 12.

In other words, when the mixture of oil and water flows into the receptacle 12, the oil, by reason of specific gravity, flows upwardly and the water passes through the separator or siphon tube 19 in the path disclosed by the arrows in FIG. 1. The water, now apart from the oil, flows into the bottom of the housing or chamber 10.

A conduit 20 communicates with the receptacle 12 and extends over the other receptacles 14–16, where a port(s) 20a is included in the conduit 20, together with an associated control valve(s). In other words, separated oil passes through conduit 20 and into one or more of the receptacles 14–16, where the latter, when filled, are readily moved, i.e. serve effective oil recovery.

A standard storage battery 24 (encased within a watertight enclosure) serves to operate a pump 25, where the latter is responsive to a floating control 25a, i.e. to the water level in the bottom of the housing or chamber 10. When a preselected water level is attained, the pump 25 becomes energized, moving the water upwardly, typically through a purifier 27, and outwardly from the chamber or housing 10 through conduit 30, i.e. in the direction of the arrows in FIG. 1, into the stream.

Figure 3:
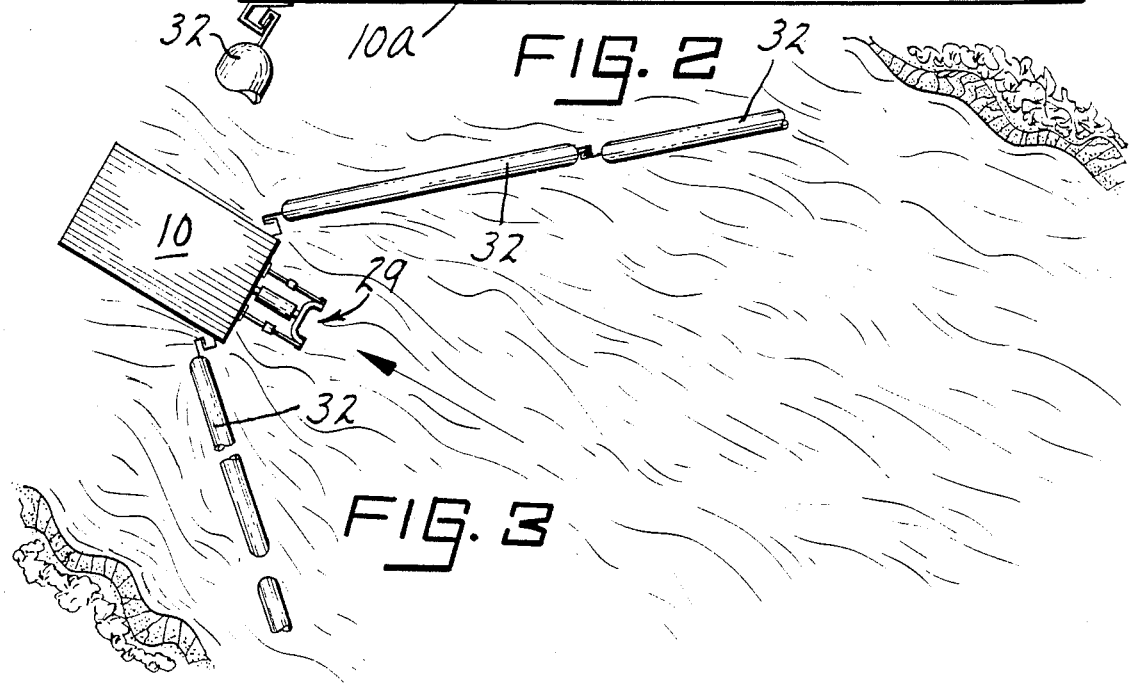

With reference now to FIG. 3, and, also, again to FIG. 2, a typical installation of the instant oil spillage recovery arrangement is disclosed, i.e. in a stream, where the water is flowing in the direction of the arrow (FIG. 3). More specifically, conduit 17 connects to a pivotal gathering head or inlet 29 for the oil and water mixture. Typically, the assembly is defined by a generally U-shaped conduit 29a communicating with conduit 17 through a hollow sleeve 17a. The conduit 29a is arranged to float on the water.

A series of standard floating booms 32 extend from opposite sides of the housing or chamber 10, typically being clipped together, but, in any event, channeling the oil-water mixture towards the gathering head or inlet 29. As stated, the housing or chamber 10 is positionable by the ballast employed in compartments 10a, i.e. at a desired location in the stream or body of water (where, as stated, the ballast also serves to accommodate water level).

As should be evident from the preceding, the oil spillage recovery arrangement presented herein satisfies a need in a simple but yet effective manner. While the housing or chamber is described in connection with booms, such could equally be used with a standard boat for oil recovery at a specific location. The arrangement is, however, susceptible to various changes within the spirit of the invention, including, by way of example, in proportioning; the number of oil receiving receptacles involved; the manner of pumping the water from the housing or chamber; the particular inlet head involved, i.e. the configuration thereof; and, the like. Thus, the preceding description should be considered illustrative and not as limiting the scope of the following claims:

I claim

1. An oil spillage recovery arrangement comprising a floatable housing including an inlet conduit receiving a mixture of oil and water, cooperating floatable boom and gathering head means directing said mixture towards said inlet conduit, a first receptacle within said floatable housing into which said mixture is introduced, a siphon communicating with said mixture within said first receptacle selectively separating said mixture and passing water into said floatable housing, where entry into said siphon is below the outlet of said inlet conduit within said first receptacle and the outlet from said siphon is outside of said first receptacle, a second receptacle within said floatable housing, conduit means selectively passing separated oil from said first receptacle into said second receptacle, pump means including a conduit for discharging said water from said floatable housing, and steadying means controlling placement of said floatable housing at a use location.

2. The oil spillage recovery arrangement of claim 1 where said steadying means is a ballast.

* * * * *